United States Patent [19]

Bouchillon

[11] Patent Number: 5,581,041
[45] Date of Patent: Dec. 3, 1996

[54] APPARATUS FOR MEASURING FLOW OF GRANULAR PARTICLES IN CONDUIT

[76] Inventor: Jerry L. Bouchillon, 252 River's Edge, Kingsport, Tenn. 37660

[21] Appl. No.: 423,880

[22] Filed: Apr. 18, 1995

[51] Int. Cl.⁶ ........................................................ G01F 1/30
[52] U.S. Cl. ........................ 73/861.73; 73/861.75
[58] Field of Search ......................... 73/861.71, 861.72, 73/861.73, 861.74, 861.75

[56] References Cited

U.S. PATENT DOCUMENTS

| | | | |
|---|---|---|---|
| 3,640,136 | 2/1972 | Notle ................................... | 73/861.73 |
| 4,470,292 | 9/1984 | Declark et al. ....................... | 73/861.73 |
| 5,343,761 | 9/1994 | Myers ................................... | 73/861.73 |
| 5,388,466 | 2/1995 | Teunissen ............................. | 73/861.77 |
| 5,413,112 | 5/1995 | Jansen et al. ......................... | 73/861.75 |
| 5,450,760 | 9/1995 | Lew et al. ............................ | 73/861.77 |

*Primary Examiner*—Richard Chilcot
*Assistant Examiner*—Max H. Noori

[57] ABSTRACT

A blade device in a helix configuration suspended in a conduit means flowing full of granular materials such as crushed coal to rotate with the flow thus indicating by a turning or electrical output device both the rate and accumulated volume of flow of the granular material.

10 Claims, 1 Drawing Sheet

APPARATUS FOR MEASURING FLOW OF GRANULAR PARTICLES IN CONDUIT

FIELD OF THE INVENTION

The rotating helix of this invention obviates many of the difficulties and disadvantages previously encountered in measuring volumetric flow of non-homogeneous granular particles such as crushed coal and homogeneous solid particles such as wheat as it is conveyed through a closed conduit such as a pipe, chute or tunnel.

BACKGROUND OF THE INVENTION

Conventional devices for measuring flow of granular products such as the traveling belt and the rotating star valve have many limitations and undesirable operating features. A traveling belt device is difficult to install in an existing arrangement of industrial storage and conveyance equipment. Rotating star valves can measure and meter flows of granular products but they are limited in rotational speed as they depend upon the free-flowing characteristics of a product to fill the empty chambers of the valve as they present themselves one at a time to a product.

As granular material flows through a closed conduit in which this invention is installed, the twisted flat plate of the apparatus is caused to rotate in a screw action at a rate directly proportional to the volumetric flow of the material. This rotation is communicated outside the confines of the conduit either mechanically, electronically, or both, for accumulative flow record keeping. Each revolution of the helix shaped device will represent a certain volume of product as determined by measured discharge calibration.

It is vitally important to continuously and directly monitor the rate of flow of some granular materials. Measuring crushed coal going into the firebox of a steam boiler is necessary so that the energy consumption efficiency can be constantly maintained as high as possible. A direct measurement of the energy input to a steam boiler is much preferred to calculating the energy input indirectly by exhaust gas analysis. Constantly monitoring the flow of certain products such as wheat and mined coal at many locations in a long conveyance system is advantageous to alert operators of equipment failure, pilferage and the amount of inventory in transit.

OBJECTS OF THE INVENTION

It is an object of this invention to provide an inexpensive, reliable way to measure the flow of heavy, coarse, dirty, abrasive, damp and non-homogeneous granular aggregate such as crashed coal, crushed stone, pelletized plastics, agricultural grain, wood chips and other like materials which previously had to be weighed in containers such as trucks or rail cars for measuring inventory.

Another object of this invention is to provide by mechanical and electronic means both the flow speed and accumulative sum of the volume of passage of granular products in a given conduit.

It is also the object of this invention to be suitable for easy installation into industrial or commercial facilities without relocation or redesign of existing equipment.

A further object of this invention is to provide a flow measuring apparatus that is flexible, able to continue operation after the impact of unusually large agglomerations in the flowing material such as frozen lumps thus preventing breakage at its connection point.

These and other objects and advantages of invention will become more apparent from a following specification and claims when taken in conjunction with the drawings.

SUMMARY OF THE INVENTION

This invention is an apparatus for measuring the rate of flow and the accumulative volume of flow of granular material in a closed conduit means such as a pipe, chute, hopper, tunnel, flexible hose, etc. The apparatus consists of a blade means which is positioned and supported in a flexible manner inside a conduit means by use of a support structure between which is attached a signal means, either mechanical or electrical, that will communicate to the outside of the conduit means the revolutions of the blade means thus representating an accurate delineation of the flow in the conduit means.

DESCRIPTION OF THE PREFERRED EMBODIMENTS

Figure 1:
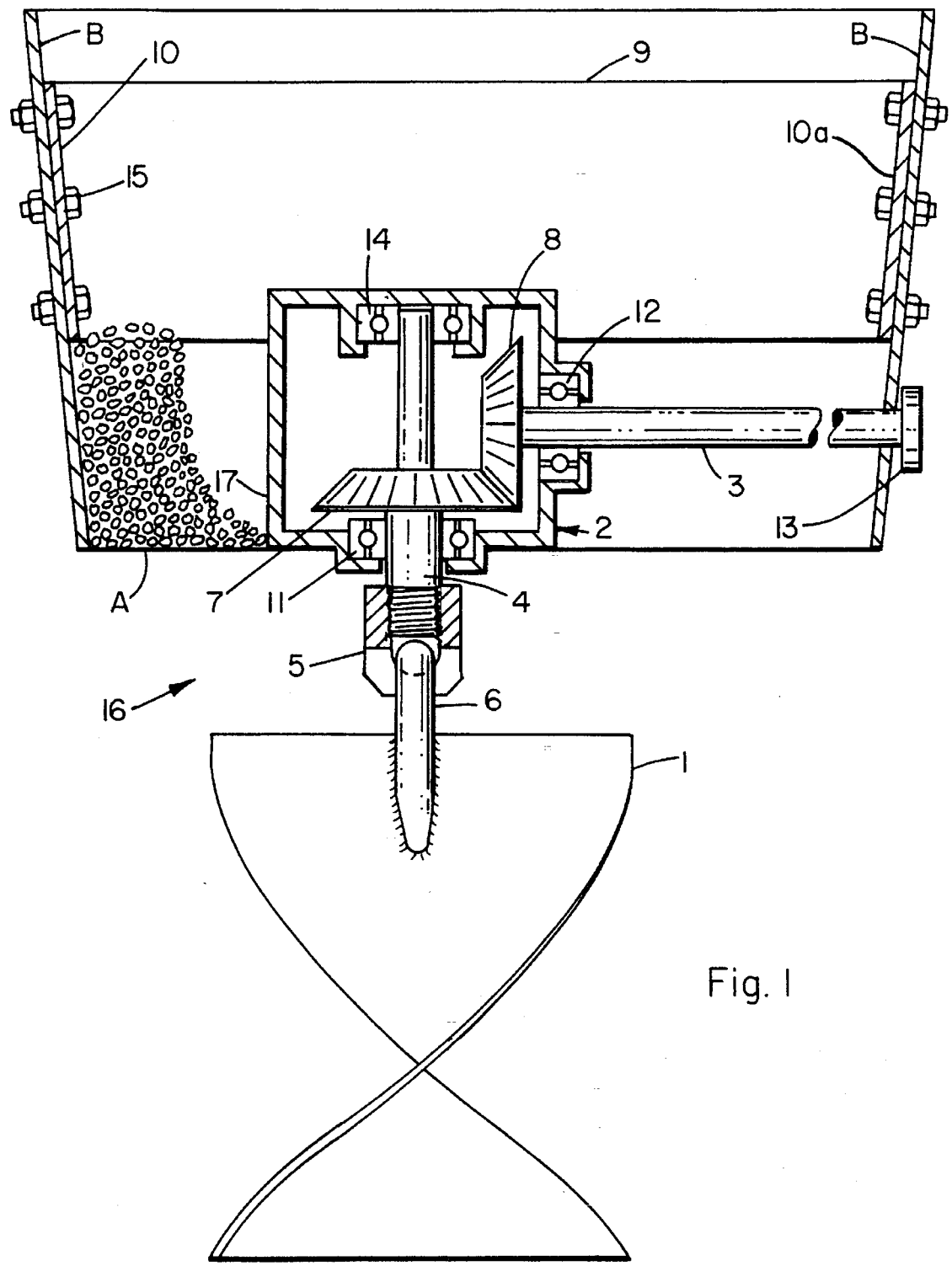
FIG. 1 is a diagrammatic vertical axial section view of the apparatus of the present invention.

Illustrated in FIG. 1 is apparatus 16 embodying the present invention for measuring the flow of granular products flowing in a conduit. Apparatus 16 is comprised of gearbox 2 which is attached to suitable structural member 9 that holds in suspension a rotating member 1. In the preferred embodiment, rotating member 1 is helical in configuration.

As shown in FIG. 1, as granular product A flows through conduit B, the sliding impingement of product A upon rotating member 1 will cause member 1 to twist axially in a screw like action thus actuating the mated gear set of gear 7 and gear 8 thereby turning shaft 3 accordingly.

It is the preferred embodiment of apparatus 16 to be installed in a conduit so product A is flowing vertically downward past gearbox 2 and then striking rotating member 1. It is not necessary for all the contents flowing in conduit B to strike rotating member 1 because the center of the flow distribution is proportional to the total flow of materials in the entire conduit.

The preferred embodiment of structural member 9 is a bar of structural metal such as stainless steel that is rectangular in cross section with the longer dimension of the rectangular cross section positioned parallel to the product flow to utilize its maximum strength in bending and to minimize impediment to flow of the product in the conduit.

Structural members 10 and 10a are made to be integral with structural member 9 as with a welded attachment, so that fastening means 15 can be used to attach apparatus 16 inside an existing conduit B. The preferred embodiment is that apparatus 16 is removable from conduit B.

Gearbox 2 is permanently fastened to structural member 9. Shaft 4 in gearbox 2 is turned by the rotating of helix 1 thus causing gear 7 to turn. Shaft 4 and gear 7 are fixed to one another. As gear 7 turns, gear 8 is caused to turn thus rotating shaft 3. Gear 8 and shaft 3 are fixed to one another. Shaft 3 in turn actuates a device 13 which mechanically or electronically (or both) records the revolutions of shaft 3. The revolutions of shaft 3 over a given period of time can be calibrated to represent the flow rate of material A flowing in conduit B.

Rotating member 1 is attached to shaft 4 through a swivel joint comprised of connector nut 5 and U-joint 6. This connector allows helix 1 to shift slightly as it rotates to accommodate large particles or fused agglomerations in the flow stream A impinging upon it. Connector bolt 5 is removable to detach helix 1 from gearbox 2 if necessary. U-joint 6 is attached to helix 1 preferably by welding.

It is a preferred embodiment of helix 1, connector nut 5 and U-joint 6 that they be made from a metal impervious to the corrosive effects of the flowing product A. For example, with crushed coal, this metal would be stainless steel.

Bearing 11, 12, and 14 are sufficient in size and strength to handle the thrust forces imposed upon shah 3 and helix 1. Gearbox 2 will have sufficient wall thickness 7 to resist the abrasive and corrosive actions of the flowing product A.

I claim:

1. An apparatus for measuring at least one of flow rate or flow volume of material thru a material feed system, said apparatus comprising wall means providing a peripherally closed material passage means, said wall means providing an open, substantially unencumbered entry section and a downstream outlet section, said passage means having a generally vertically oriented flow axis, force reactive means rotatably mounted on said apparatus by connector means and extending within said outlet section for rotation therein about a rotational axis which is only generally coextensive with said flow axis, said force reactive means being provided with blade means having contact surface adapted for contact with a downwardly falling flowstream of said material within and thru said sections, said blade means having its contact surfaces free of any encumbrances and being adapted for rotation upon contact with said flowstream of material with said contact portions, signal means having signal generating and transmission structure associated with said force reactive means and responsive to the rotation of said force reactive means to provide material flow information to operating personnel.

2. Apparatus of claim 1 wherein said signal is proportional to the revolutions of said force reactive means.

3. The apparatus of claim 2 wherein said connector means substantially comprises a universal joint which allows said reactive means to swing about said connector means in substantially any direction in response to uneven forces applied against said blade means by said material, while said reactive force means is in rotational motion.

4. The apparatus of claim 1, wherein said transmission structure of said signal means is adapted to communicate rotation of said force reactive means at a right angle to said flow axis and exteriorly of said wall means, regardless of the relative orientation of said flow axis and said rotational axis.

5. The apparatus of claim 4, wherein said signal transmission means comprises shaft means geared to said force reactive means and rotatable thereby, and wherein electronic signal generating means is coupled to said shaft means for producing a reading of the number of revolutions of said force reactive means per unit time.

6. The apparatus of claim 1 wherein said blade means has a helical screw type configuration.

7. The apparatus of claim 1 wherein said material is selected from the group consisting of solid granular material crude oil, viscous liquids, or slurries of granular materials in a liquid.

8. The apparatus of claim 1, wherein said signal generating and transmission structure comprises first gear means connected to said connector means and rotatable therewith in response to rotation of said force reactive means, second gear means intermeshed with said first gear means at substantially a right angle thereto, shaft means affixed to said second gear means and extending thru said wall means, support means on said apparatus for rotatably mounting said first and second gear means and shaft means, and flow meter means associated with said shaft means exteriorly of said wall means for recording the revolutions of said shaft means whereby total flow of material per unit time can be obtained by an operator.

9. The apparatus of claim 1, wherein said support means comprises a gear box affixed to the approximate mid point of beam means spanning opposite portions of said wall means such that the rotational axis of said first gear means is coextensive with said flow axis.

10. The apparatus of claim 1, wherein said force reactive means comprises plate means twisted about a longitudinal axis to provide helical blade means and having an upper end affixed to said connector means and an opposite free and supported end, wherein said connector means provides a swivel connection of said upper end to said first gear means, and whereby non-symmetrical impact forces of said material on said contact surfaces of said blade means will cause said unsupported end to swing in an arc out of said flow axis.

* * * * *